July 22, 1958 P. MEYER 2,844,074
PRESSURE CONTACT CONTROL FOR CAM CUTTING MACHINES
Filed Dec. 19, 1955 4 Sheets-Sheet 1

INVENTOR
PETER MEYER
BY
ATTORNEY

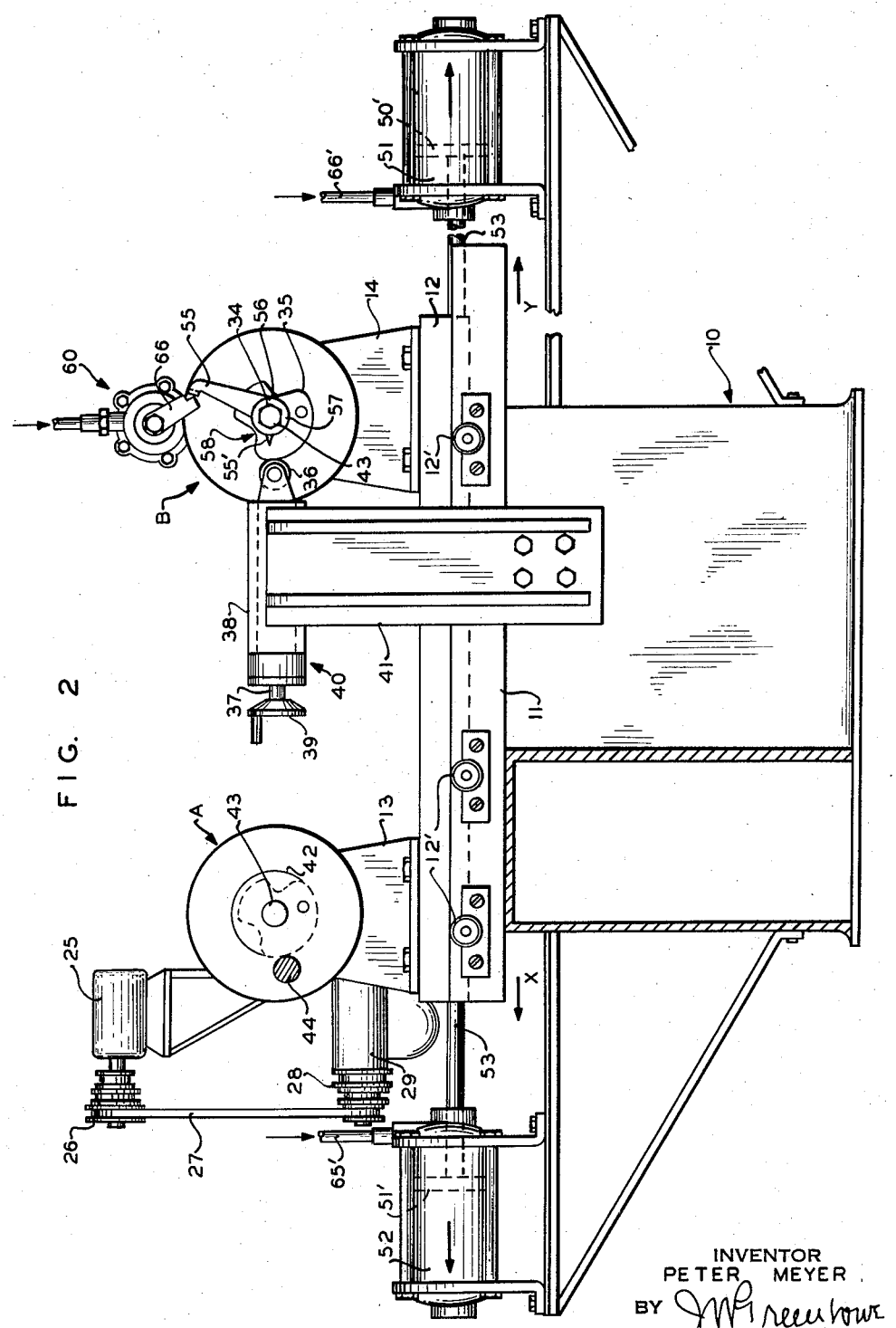

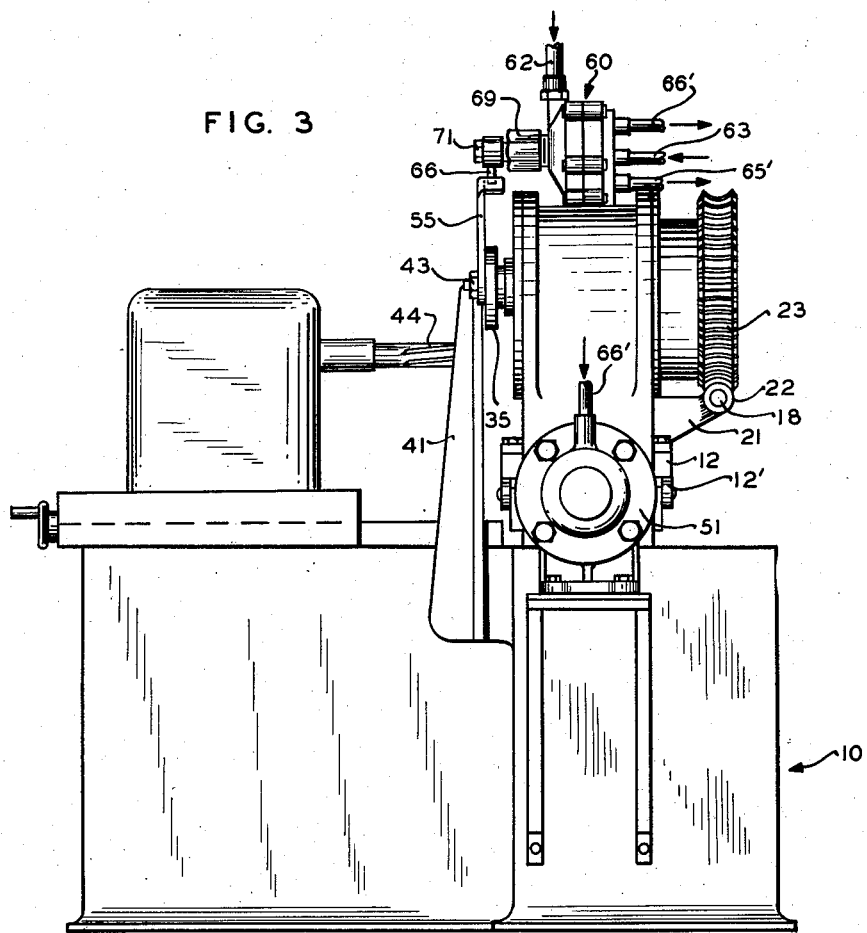
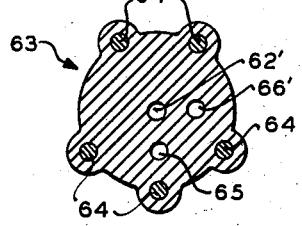
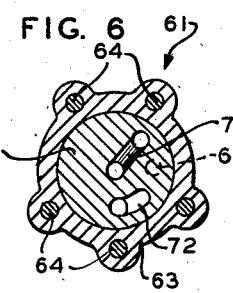
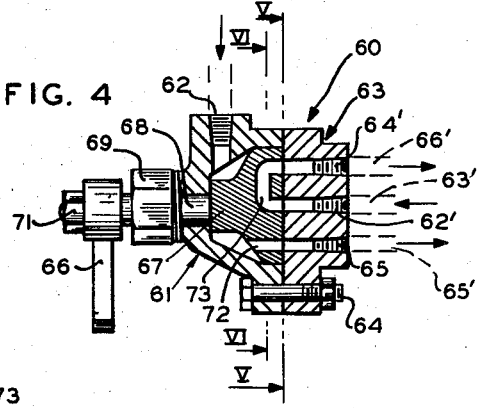

July 22, 1958  P. MEYER  2,844,074
PRESSURE CONTACT CONTROL FOR CAM CUTTING MACHINES
Filed Dec. 19, 1955  4 Sheets-Sheet 4
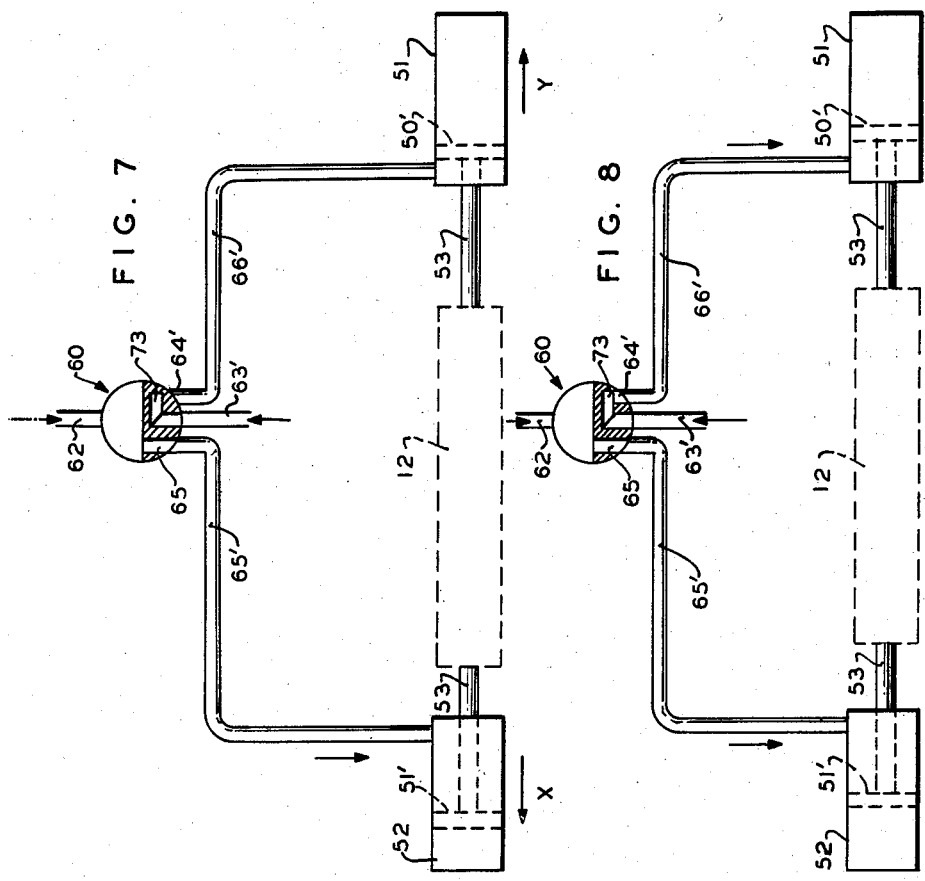
INVENTOR
PETER MEYER
BY
ATTORNEY

United States Patent Office 2,844,074
Patented July 22, 1958

2,844,074

PRESSURE CONTACT CONTROL FOR CAM CUTTING MACHINES

Peter Meyer, Watchung, N. J.

Application December 19, 1955, Serial No. 553,898

5 Claims. (Cl. 90—13.4)

The present invention relates to cam cutting machines and relates more particularly to a machine wherein the degree of contact between the cutter and the cam blank is regulated and/or controlled.

A machine of the type to which the present invention is applied is shown in my co-pending application Ser. No. 528,273, filed August 15, 1955. In a machine of this general type, and in accordance with the well known practice, a cam is formed from a metal blank by means of a cutting tool. The machine includes a support for a rotating master cam and a support for a rotating blank. The supported master or pattern cam and cam blank are rotated synchronously about separate shafts spaced apart and disposed in a common plane.

Mounted on a stationary support and in contact with the perimeter of the master or pattern cam is a guide member or follower. Also mounted on a stationary support and positioned for contact with a cam blank is a grinder or milling cutter. The cam blank and the master cam are rotated at a relatively low rate of speed and are moved as a unit. Thus, when in operation the traveling contact between the guide member and the master cam surface controls the operation of the cutting tool or grinder as applied to the cam blank, to produce a cam having the configuration of the master cam upon a complete revolution of the master cam and cam blank.

In the manufacture of cams it is, of course, essential to be able to produce cams of various configurations, some of which are of circular perimeter over the greater portion of their cam surfaces and have but slight variations from the circular. On the other hand, most cams although of circular perimeter to an appreciable extent, include what may be termed drop portions, as in heart or jump cams. When a cam of this configuration is in the process of formation, the guide member in contact with the master cam is subjected to a sudden change in the direction of movement from travel along a pattern cam surface of uniform radius to movement over a surface of rapidly decreasing radius, as when the cam follower reaches the drop portion of the master or pattern cam. The force applied, therefore, if uniform and determined by the greatest radius of the master cam, will vary with a sudden change in the radius of the master cam and, unless controlled, has the tendency to cause a separation of the cam follower and the surface of the master cam, and a similar separation between the cutting tool and the cam blank.

The present invention provides a construction whereby the applied force to maintain the guide member in contact with the master or pattern cam may be so regulated and controlled that the degree of the applied force is varied in accordance with the contour of the peripheral surface of the pattern cam over which the guide member travels to control the grinding or cutting of the cam blank.

An object of the present invention is to provide a cam cutting machine so constructed and arranged that the degree of the applied force to maintain the cutter and blank in operating relation may be varied during the cutting operation.

Another object of the invention is to provide a cam cutting machine wherein degree of contact between the cutter and the cam blank may be adjusted to meet variations in the path of travel of the cam follower when in contact with a master cam.

Other objects and advantages of the invention will be more fully understood by reference to the following description together with the accompanying drawing in which:

Fig. 2 is an elevational view of the machine shown in Fig. 1;

Fig. 3 is an end elevational view of the machine;

Fig. 4 is a view of a pressure valve partly in cross section;

Fig. 5 is a view taken on line V—V in Fig. 4;

Fig. 6 is a view taken on line VI—VI in Fig. 4;

Fig. 7 is a schematic view of a fluid presure line showing a valve indicated for the flow of fluid at a given pressure, and;

Fig. 8 is a view similar to Fig. 7, but showing a valve adjusted for the flow of a fluid of a different pressure.

Figure 1:
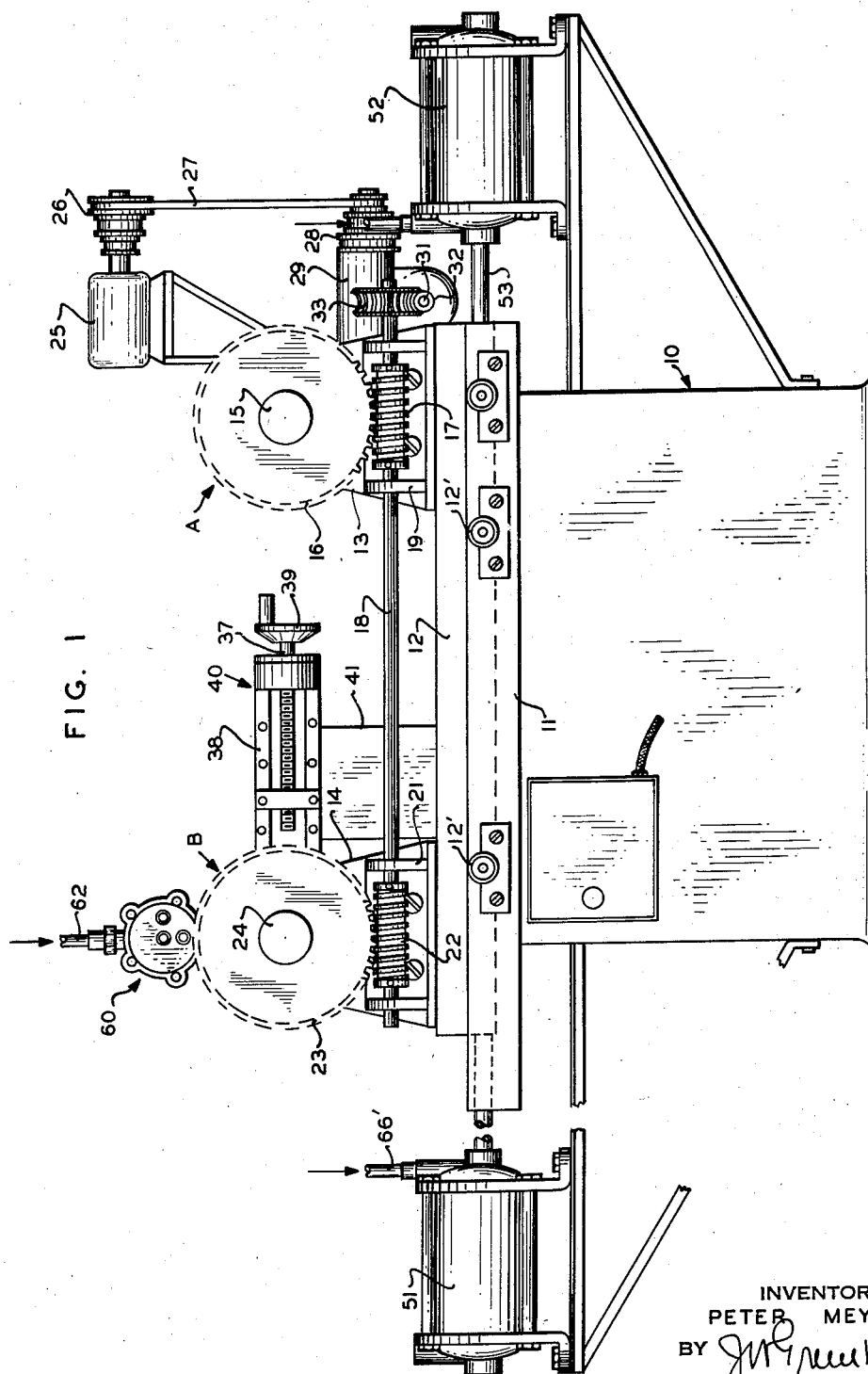
Fig. 1 is a side elevational view of one side of a machine to illustrate one embodiment of the present invention.

As shown, a machine constructed to illustrate one practical embodiment of the invention may include a standard or frame 10 on which is mounted a base 11 for a slide member or platen 12, movable on adjustable rollers 12'. Brackets 13 and 14 are secured to the slide member 12 for movement therewith. Bracket 13 supports a spindle 15 at one end of which is mounted a drum A with worm wheel 16 in mesh with a worm 17 rotatable on shaft 18 journaled in bearing brackets 19 and 21. A worm 22 is also mounted on shaft 18 and disposed in mesh with worm wheel 23 mounted on a drum B rotatable on spindle 24 and supported on bracket 14.

The drums A and B on spindles 15 and 24, respectively, are driven by means of a suitable driving mechanism consisting of standard brake motor 25 provided with cone pulley 26 connected by belt 27 to a cone pulley 28 on a shaft of reduction gear box 29. Shaft 31 extending from gear box 29 drives a worm 32 in mesh with worm wheel 33 secured to shaft 18. The driving mechanism including shaft 18 is mounted on and is movable with slide member 12, to permit travel of the drums A and B as a unit.

Secured to one end 34 of the spindle 24 of drum B (see Fig. 2) is a master cam 35 of any selected configuration for rotation with the drum. Adjacent to the master cam is guide roller or cam follower 36 mounted at one end of a threaded rod 37 rotatable in an internally threaded housing 38. The other end of rod 37 is provided with a hand wheel 39. The housing and threaded rod which perform to give longitudinal adjustment in what may be termed a tail stock 40 are mounted on a bracket 41 secured to standard 10. A rotation of hand wheel 39 serves to move the roller 36 into or out of contact with the peripheral surface of the master or pattern cam 35.

A cam blank 42 is secured to an end 43 of the spindle 15 of drum A for rotation with the drum in unison with the rotation of drum B on which the master cam is mounted for rotation. The cam blank or stock 42 from which a cam, duplicating cam 35, is to be formed may be shaped by grinding or by the controlled application of a milling cutter 44. This cutter 44 may be rotated by a brake motor of any suitable well known type, not shown.

The drums carrying the master cam and cam blank, being movable as a unit, may be adjusted to bring cutter 44 into contact with cam blank 42 and the master cam 35 adjacent to roller 36. The roller or cam guide member being adjustable in tail stock 40, hand wheel 39 may be actuated to bring roller 36 into operative contact with the peripheral surface of the pattern cam 35.

When the cutter 44 and cam follower 36 are in operative relation to the cam blank and master or pattern cam, contact must be maintained throughout the cam forming operation.

The present invention not only operates so that contact is maintained, but in such manner that the degree of contact is so controlled that the force applied to hold the cam follower and master cam in contact is regulated in accordance with the radial variation of the peripheral contact surface, over which the cam follower moves while in contact with the master cam.

One practical arrangement in accomplishing this controlled pressure contact is to provide pressure chambers such as air cylinders 51 and 52 disposed at opposite ends of the slide member 12 on which the drums A and B are mounted. The pressures in the cylinders may be controlled by a suitable valve means, to be described, to operate a plunger 53, the opposite ends of which are secured to pistons 50' and 51' in opposite cylinders 51 and 52 secured intermediate its ends to the slide member 12, on which the supports for the pattern cam 35 and cam blank 42 are mounted.

Thus, for example, valve means may be actuated to cause pressure to be applied to move the piston in cylinder 52 to cause the stem or plunger 53 to move slide member 12 and the master cam will be held in contact with roller 36 at which time the cutter 44 will be held with the same degree of pressure in contact with cam blank 42. As stated above, in cases where the master cam to be duplicated varies only slightly in contour, the contact control by weight or other constant force is practical. When a master cam of the heart cam or other type is to be made, the sudden variation or drop in cam diameter presents a problem in maintaining the required uniform and positive contact.

The provision of pressure cylinders as shown makes possible the desired pressure contact control. When a master cam such as shown is to be used, an adjustable finger 55 is provided. This finger may have a hub 56 at one end and a block nut 57 may be provided for securing the hub in an adjusted position on threaded end of the spindle 24 to which the master cam is secured.

When the master cam has a relatively short radius portion 58, the finger 55 which is provided with a pointer 55' may be set at a point where the variation from cylindrical at maximum radius to the dip or lesser radius portion begins to occur. When the master cam moves to position where the drop begins the finger or control arm 55 actuates a regulating valve 60 in a manner to be described, which may be operated to cause fluid under pressure to enter cylinder 51.

The control of the degree of applied pressure contact between the cam follower and the pattern cam, to control the degree of contact between the cutter and cam blank may be accomplished in various ways. The present practical embodiment of the invention provides a system wherein the cam follower and cutter are held in contact with the pattern cam and cam blank, respectively, with a selected degree of pressure supplied from a pressure source. A variation in the degree of applied force may be attained by regulating the pressure of the supply source to vary the degree of the initial contact under which the cam cutting operation is performed. It has been determined, however, that the initail degree of pressure from a given source may be held constant. When the operation being performed calls for a lesser force, a counter pressure source is employed to apply a force in an opposite direction and, thus reduce the initially applied pressure thereby effectively relieving the initial force in a manner to more readily obtain a finer degree of control.

As shown, a valve 60 is provided which may be of any suitable type and includes a casing 61 having inlet 62 and a face plate 63 secured to the casing by bolts 64. The casing 61 is provided with an outlet 65 which connects with a conduit 65' leading to cylinder 52 (see Figs. 7 and 8) to move piston 51' in the direction of arrow X. Thus the slide member 12 connected to piston rod 53 is moved to bring pattern cam 35 into contact with cam follower 36 and cam blank 42 into cutting relation with cutter 44. The degree of pressure contact may be predetermined and may, for example, be on the order of 100 lbs. to the square inch.

The machine may be put into operation with the cam follower in contact with the surface of the pattern cam at a point of its greatest diameter. The finger 55 has been set to engage an arm 66 of valve 60 when the cam follower approaches the drop portion of the pattern cam where the surface falls away and where the initial force applied would tend to cause slippage or in some cases result in a separation between the cam follower and the inclined surface of the pattern cam.

As stated above, means may be provided for actuation by said arm 66 to regulate the initial pressure source. As shown, however, the present structure includes the valve casing 60 which is provided with a cut-off valve member 67 having a spindle 68 extending through a stuffing box 69 and secured to arm 66 by means of lock nut 71. The cut-off valve rotates against face plate 63 which is provided with an elongated passage 72 (see Fig. 6) to permit flow of fluid from inlet 62 to outlet 65 during movement of the cut-off member 67 to permit constant fluid flow to cylinder 52 to maintain continuous contact between the cam follower and cam pattern and cutter tool in contact with the cam blank.

The face plate 63 is provided with inlet 62' connected to conduit 63' for the flow of a pressure fluid from a source of supply not shown and passage 73 in cut-off valve member 67 connects inlet 62' to outlet 64' which in turn connects with conduit 66' leading to cylinder 51 to actuate piston 50' and exert a counter pull in the direction of arrow Y in opposition to the force exerted by the opposite movement of piston 51'. During the initial operation the cut-off valve member 67 is positioned to cut-off the flow of fluid from the source through conduit 63'.

When the positioned arm 55 moves with the pattern cam to engage arm 66 of the valve 60, the cut-off member is rotated to bring passage 73 into communication with inlet and outlets 62' and 64' to cause fluid under pressure to actuate piston 50' and counteract the force applied under the action of piston 51'.

If, as mentioned, the applied initial working pressure is 100 lbs. per square inch, the cam cutting operation may continue until the pattern cam is moved for the cutting of the drop portions. The arm 55 having been set to engage the valve arm 66 at this point the cut-off valve member 67 is moved and counter fluid is supplied to exert a force of, say, 50 lbs. per square inch, depending on the conditions which govern the cutting operation. Thus the initial force applied is counteracted upon and the control of the degree of applied effective pressure is made less effective, which gives a smoother operation than if the initial pressure were lowered.

As is well known, the cam cutting operation is performed at a relatively slow rate of speed. The drums or supports for rotating the cam pattern and the cam blank are, as pointed out, driven by worms and worm wheels. The ratio of the gearing is such that the rotatable supports make one complete revolution in about thirty minutes, more or less, depending on the character of the material being worked upon.

As will be evident, the present invention makes it possible to automatically control the cutting operation to vary the degree of contact when required, to not only avoid the formation of an inaccurate configuration of the produced cam, but to remove the danger of damage to the cutting tool when subjected to a constant degree of pressure contact with a cam blank having the configuration as above set forth.

Although a preferred embodiment of the invention is shown and described herein, it is to be understood that modifications may be made therein without departing from the spirit and scope of the invention as set forth in the appended claims.

What is claimed is:

1. A cam cutting machine comprising a slide member, a support for a cam blank, a support for a pattern cam, both of said supports being carried by said slide member in axially parallel fixed relation to each other, a tool holder for presenting a tool in cutting engagement with said cam blank, a cam follower disposed in a relatively fixed position adjacent to said pattern cam and adapted to shift said pattern cam by rotation of said pattern cam thereagainst and thereby shift said slide member and cam blank correspondingly with said pattern cam, means for rotating said cam blank and said pattern cam continuously at a constant speed and in unison, means for applying a selected degree of force to said slide member to both hold said tool in contact with said cam blank and said pattern cam in contact with said cam follower, and adjustably movable means adjustable to desired location at a variation in the configuration of said pattern cam said adjustable means rotating with said pattern cam for controlling the degree of force applied to slide said slide member.

2. A cam cutting machine comprising a slide member, a support for a cam blank, a support for a pattern cam, both of said supports being carried by said slide member and rotatably supporting said cam blank and pattern cam in axially parallel fixed spaced relation to each other, a tool holder proximate to said cam blank support for presenting a tool in cutting engagement with said cam blank, a cam follower disposed in a relatively fixed position adjacent to said pattern cam and adapted to shift said pattern cam by rotation of said pattern cam thereagainst and thereby shift said slide member and cam blank correspondingly with said pattern cam, means for rotating said cam blank and pattern cam continuously at a constant speed and in unison, means for applying a selected degree of force to said slide member to both hold said tool in contact with said cam blank and said pattern cam in contact with said cam follower, and a member adjustably applicable to and movable with said pattern cam for changing the degree of force applied to slide said slide member and thereby changing the pressure of said tool in its cutting engagement with the cam blank as the cam blank continues its constant speed of rotation.

3. A cam cutting machine including a base member, a slide member movable relatively to said base member, a support for a pattern cam and a support for a cam blank mounted on said base with the pattern cam and cam blank in axially fixed spaced relation to each other, a tool holder secured to said base member for supporting a tool adjacent to said cam blank, a cam follower, means for supporting said cam follower in fixed position and engaged by said pattern cam whereby said pattern cam is required to move laterally as it rotates in engagement with said fixed cam follower, means for rotating said pattern cam and cam blank synchronously and continuously at a common constant speed, a pressure cylinder having a piston at one end of said base, a second pressure cylinder having a piston at the other end of said base, a piston rod extending from said first mentioned cylinder and secured at an end of said slide member, another piston rod extending said second cylinder and secured to the other end of said slide member, a fluid pressure source for actuating one of said pistons to move said slide member in one direction to cause said tool to contact said cam blank and to cause said pattern cam to contact said cam follower with equal force of a selected degree, a second fluid source supplying a lesser pressure to the other of said pistons in a direction tending to slide the slide member in a direction opposite to actuation of said slide member by the first said piston, a trip lever adjustably secured in its relative position to said pattern cam to revolve therewith, and a valve for controlling the flow of said lesser fluid pressure to its piston, said valve having a control arm therefor operable by said trip lever to open said valve to supply fluid pressure to said second piston upon rotary movement of said pattern cam and trip lever to a predetermined position to apply a counter force to said slide member and thereby reduce the pressure of the cam blank against the tool as the cam blank continues its constant speed of rotation.

4. A cam cutting machine comprising a base member, a slide member movable relative to said base member, a support for a pattern cam and a support for a cam blank mounted on said base member with the pattern cam and cam blank in axially fixed spaced relation to each other, a tool holder secured to said base member for supporting a tool adjacent to said cam blank, a cam follower, means supporting said cam follower in fixed position adjacent to and engaged by said pattern cam whereby said pattern cam is required to move laterally as it rotates in engagement with said fixed cam follower, means for rotating said supported pattern cam and cam blank synchronously and continuously at a constant speed to completion of a single full revolution, a first pressure cylinder having a piston at one end of said base member, a second pressure cylinder having a piston at the other end of said base member, a piston rod extending from said first pressure cylinder and secured to an end of said slide member, another piston rod extending from said second pressure cylinder and secured to the other end of said slide member, a fluid pressure source for actuating one of said pistons to move said slide member in one direction to cause said tool to contact said cam blank with a given degree of force and to cause said pattern cam to contact said cam follower with equal force, a second fluid pressure source connection for applying pressure to the other of said pistons, a valve for controlling the flow of fluid admitted by said connection to its associated piston, and a member adjustably secured to and rotating with said pattern cam for actuating said valve at a predetermined rotative position of said pattern cam to admit fluid pressure to said second piston in said second cylinder to apply a force directly to said slide member in a direction resisting the movement of said slide member under its actuation by the first said piston while said pattern cam and cam blank continue uninterrupted constant speed rotation.

5. The method of shaping a cam blank to duplicate the configuration of a pattern cam, which comprises rotating a pattern cam and a cam blank synchronously and continuously at constant speed, moving the rotating pattern cam and cam blank into contact with a cam follower and a cutting tool respectively, applying a force of selected degree both to the cam blank and cam follower to maintain said respective contacts, and varying the degree of said applied force of the tool against the cam blank at a predetermined location of rotation of said pattern cam with said pattern cam and cam blank uninterruptedly continuing rotating at said constant speed.

References Cited in the file of this patent

UNITED STATES PATENTS

| 2,050,127 | Sassen | Aug. 4, 1936 |
| 2,092,202 | Bennett | Sept. 7, 1937 |
| 2,347,367 | Rosen | Apr. 25, 1944 |
| 2,401,803 | Turchan et al. | June 11, 1946 |
| 2,415,801 | Armitage et al. | Feb. 11, 1947 |